March 30, 1965  R. D. CHEVERTON  3,175,955
GRADIENT FUEL PLATES
Filed Jan. 11, 1961  4 Sheets-Sheet 1

INVENTOR.
Richard D. Cheverton
BY

ATTORNEY

INVENTOR.
Richard D. Cheverton

INVENTOR.
Richard D. Cheverton
BY
ATTORNEY

March 30, 1965  R. D. CHEVERTON  3,175,955
GRADIENT FUEL PLATES
Filed Jan. 11, 1961  4 Sheets-Sheet 4

INVENTOR.
Richard D. Cheverton
BY
ATTORNEY

United States Patent Office 3,175,955
Patented Mar. 30, 1965

3,175,955
GRADIENT FUEL PLATES
Richard D. Cheverton, Knoxville, Tenn., assignor to the United States of America as represented by the United States Atomic Energy Commission
Filed Jan. 11, 1961, Ser. No. 82,141
7 Claims. (Cl. 176—68)

This invention relates generally to the neutronic reactor art and more particularly to fuel elements for reactors of the flux-trap design.

Reactors of the flux-trap design are characterized by cores which are undermoderated and disposed adjacent to relatively large moderating reflectors. These design features afford a high fast-neutron leakage from the core into the adjacent reflector with the result that a substantial portion of the neutron moderation accomplished within the reactor occurs in the reflector region thereof. As a consequence, the thermal flux in flux trap reactors forms a peak in the reflector, which is advantageous since minimum practical fuel loadings limit the flux obtainable in the core and since isotope production, materials testing, and other types of research are more easily conducted in the reflector than in the core.

A particularly useful flux trap configuration comprises a cylindrical mass of moderator provided with a relatively thin annular region of fuel. This configuration is utilized in the Thermal Test Reactor which is briefly described in Glasstone, Principles of Nuclear Engineering, pp. 830–833, D. Van Nostrand, New York, 1955. Fuel elements of the design disclosed herein may be incorporated in that or other similar reactors.

The flux-trap design, however, has the disadvantage that a non-uniform power density exists in the core region. This non-uniformity is inherent in the design because of the undermoderation of the core and the moderating effect of the reflector. Since the thermal neutrons which are moderated in the reflector region diffuse back into the core, the rate of fission is highest in the core region which is adjacent to the reflector and is lowest at the point farthest removed from the reflector.

The power level of a reactor is limited by the ability of the core in the region of the highest power density to withstand the effects of temperature and radiation. Where the power distribution is non-uniform, only the high-power-density region of the core is performing at its utmost. Thus, uniformity of power density is desirable for maximizing the peak thermal flux in the reflector per unit maximum power density.

It is well known that in many types of reactors a uniform power density distribution can be achieved by varying fuel concentration within a reactor core in such a manner that the highest fuel concentration occurs in the region of the core where the lowest power density existed with a uniform fuel distribution, and the lowest fuel concentration occurs where the highest power density existed with a uniform fuel loading. Where the fuel is disposed in rods, the thickness of which is quite small in comparison to the core thickness, a fuel concentration gradient may be effected by placing a different amount of fuel in each rod, or by rearranging fuel elements during reactor operation to place partially spent elements in locations where a suppression of flux is desired. In plate-type fuel elements, wherein a central core is surrounded by a protective cladding, the concentration variation has been achieved by providing a central core which varies in thickness inversely with the neutron flux across its width. However, as will be brought out below, a fuel concentration gradient alone has proved to be insufficient in some situations.

It will be appreciated that a neutronic reactor undergoes major changes in flux distribution and fuel concentration throughout its operating lifetime. In high flux reactors, the lifetime is short, usually only several weeks in length, and these changes occur rapidly. Since the power density at any point within a reactor is proportional to the product of the neutron flux and the fuel concentration at that point, the changes in flux and concentration mentioned above cause a change in the power density distribution. Thus, if fuel is distributed to provide an initial uniform power density, changes which occur during operation may cause a highly undesirable power distribution at some later time during the operating cycle.

Moreover, to have an appreciable operating lifetime, high flux reactors must have a high built-in excess reactivity. Usually, this excess reactivity is held out by shim control rods which are slowly withdrawn during reactor operation. Such rods introduce flux perturbations which may effect the entire core when the core is of the small, highly enriched type. As the control rods are withdrawn, the perturbations which they cause become less and less.

Burnable poisons such as boron are known to be useful in controlling power distribution and it would be highly desirable if they could be used in conjunction with the variable fuel concentration technique to compensate for the above-mentioned changes which occur during reactor operation. Burnable poisons generally have been homogeneously dispersed in the fuel of reactors in which they are used. Unfortunately, however, if a fuel-concentration gradient element is formed from such homogeneous mixtures, a burnable poison concentration gradient will be necessarily produced along with the fuel-concentration gradient. To make full use of the burnable poison, the poison must be distributable in any manner desired by the reactor designer. For example, it may be necessary to distribute the poison uniformly. In other situations it may be necessary to distribute it in a gradient which differs in magnitude and/or direction from the fuel concentration gradient.

It is, therefore, a major object of the invention to provide a fuel element having internal fuel and burnable poison concentration gradients simultaneously.

Another object of the invention is to provide a fuel element having an internal fuel concentration gradient together with a uniform dispersion of burnable poison.

Other objects of the invention will become apparent from an examination of the following description of the invention and the drawings appended thereto, wherein.

In accordance with the present invention, the aforementioned objects are met by providing a composite central-fuel-plate core comprising a primary fueled core which varies in thickness, and a secondary core containing burnable poison covering at least one major surface of the primary core.

Figure 1:
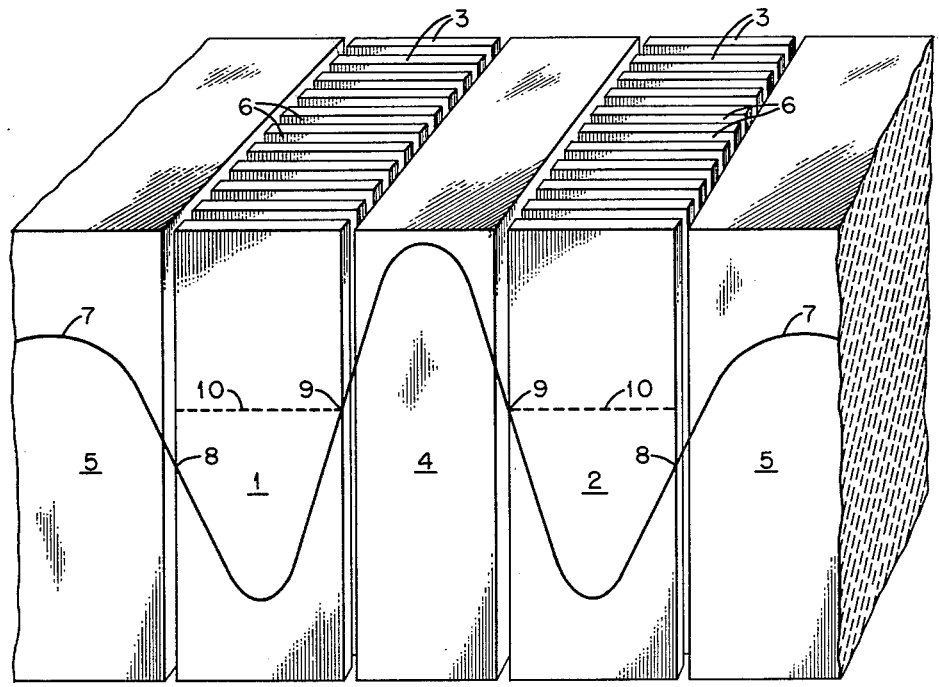
FIG. 1 is a schematic illustration of a reactor configuration utilizing the flux-trap principle.

Referring now to FIG. 1, which is a schematic view of a reactor configuration utilizing the flux-trap principle, two fuel regions 1 and 2, each of which comprises a multiplicity of fissionable-fuel-bearing plates 3 disposed in parallel spaced relationship, are separated by modulator island 4 and enclosed by moderating reflectors 5. The configuration is adapted to conduct a flow of a moderating-liquid coolant, such as water, through spaces 6 defined by plates 3. The geometry and the fuel-to-moderator ratio of the core, which comprises plates 1 and the moderating liquid flowing therebetween, are such that a great percentage of fast neutrons escape from the core into the surrounding moderator-reflector bodies 5 and moderator island 4. (Generally speaking, the metal-to-moderator ratio must be high, i.e., >0.7, and the core thickness must be small in comparison to a few neutron migration lengths in the fuel region in order to provide a high fast neutron leakage.) Due to the moderating properties of the reflectors, these fast neutrons quickly fall to thermal energies and are scattered back into the core to cause further fissioning. As a result, the thermal neutron flux of the reactor assumes the shape schematically illustrated by curve 7 which is superimposed on the face of the configuration shown in FIG. 1.

When the fuel distribution in the plates 3 is uniform, the thermal neutron flux across the core is approximately proportional to the power density therein, and it can be seen from the shape of the flux curve in FIG. 1 that the power density in the core of the configuration illustrated forms peaks at points 8 and 9 adjacent to the core-reflector interface. Ideally, the power distribution across the core is that which is illustrated by the dotted line 10, in which case the average power density would be equal to the maximum permissible power density.

Figure 2:
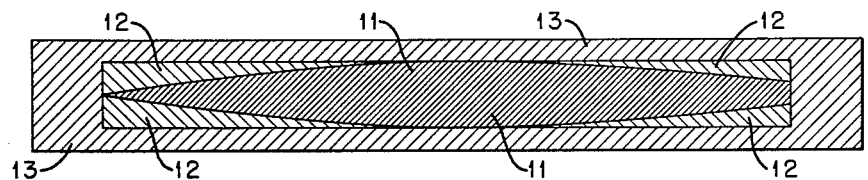
FIG. 2 is a transverse sectional view of a fuel plate constructed in accordance with the present invention.

Referring now to FIG. 2, which is a horizontal, transverse, sectional view of a fuel plate constructed in accordance with the present invention, the ideal flat power distribution, illustrated by dotted line 10 in FIG. 1, is afforded by providing a primary fuel core 11 which varies in thickness inversely with the neutron flux across its width in the manner illustrated. Surrounding the primary fuel core 11 is a secondary core 12, the function of which will be described below, and a protective cladding 13. The primary fuel core 11 contains the fissionable fuel, and may comprise either an alloy or a powder metallurgy dispersion.

As was stated previously, it is often desirable to distribute a burnable poison within the fuel plates of a reactor in a concentration gradient which differs from the fuel concentration gradient. In accordance with the present invention, such a dispersion of boron is afforded by providing a secondary core containing burnable poison. Referring again to FIG. 2, the primary core 11, which contains the fissionable fuel, is covered by a secondary core, which comprises two pairs of wedge-shaped segments 12. The secondary core contains no fissionable fuel, but contains a burnable poison dispersed in any innocuous carrier material such as aluminum. The thickness of the secondary core may vary in any manner to provide the poison distribution that is desired.

By utilization of a composite core, an infinite number of combinations of primary and secondary core shapes and compositions can be constructed to yield any desired power distribution in a reactor. For example, boron can be distributed uniformly throughout the primary and secondary cores at the same concentration, and the shape of the secondary core wedges adjusted so that the two core sections (i.e., primary and secondary) form a composite core of uniform thickness. This combination is illustrated in FIG. 2, and provides a uniform dispersion of poison together with a gradient distribution of fuel. If boron is left out of the primary core, a boron gradient, opposite in direction to the fuel gradient, will result. Alternately, the wedges which make up the secondary core may be shaped differently than is illustrated in FIG. 2, to provide any desired boron gradient in any direction.

As shown in FIG. 2, secondary core 12 covers both of the two major surfaces of primary core 11. Although this disposition is preferred, the secondary core may suitably be disposed to cover only one major primary core surface. If this alternate disposition is used, the primary and secondary cores will have only one interfacial contact and each will be adjacent to one cladding plate.

An additional important beneficial result is afforded by the composite fuel plate described above. Frequently, it is difficult to achieve a sound bond between the cladding and fuel core of a fuel plate. In a composite core, the carrier material in the secondary core segment may be selected from materials which bond more easily to the cladding than the materials used in the primary core would bond to the cladding. Thus, the reactor designer has a greater number of cladding materials from which to choose.

Figure 3:
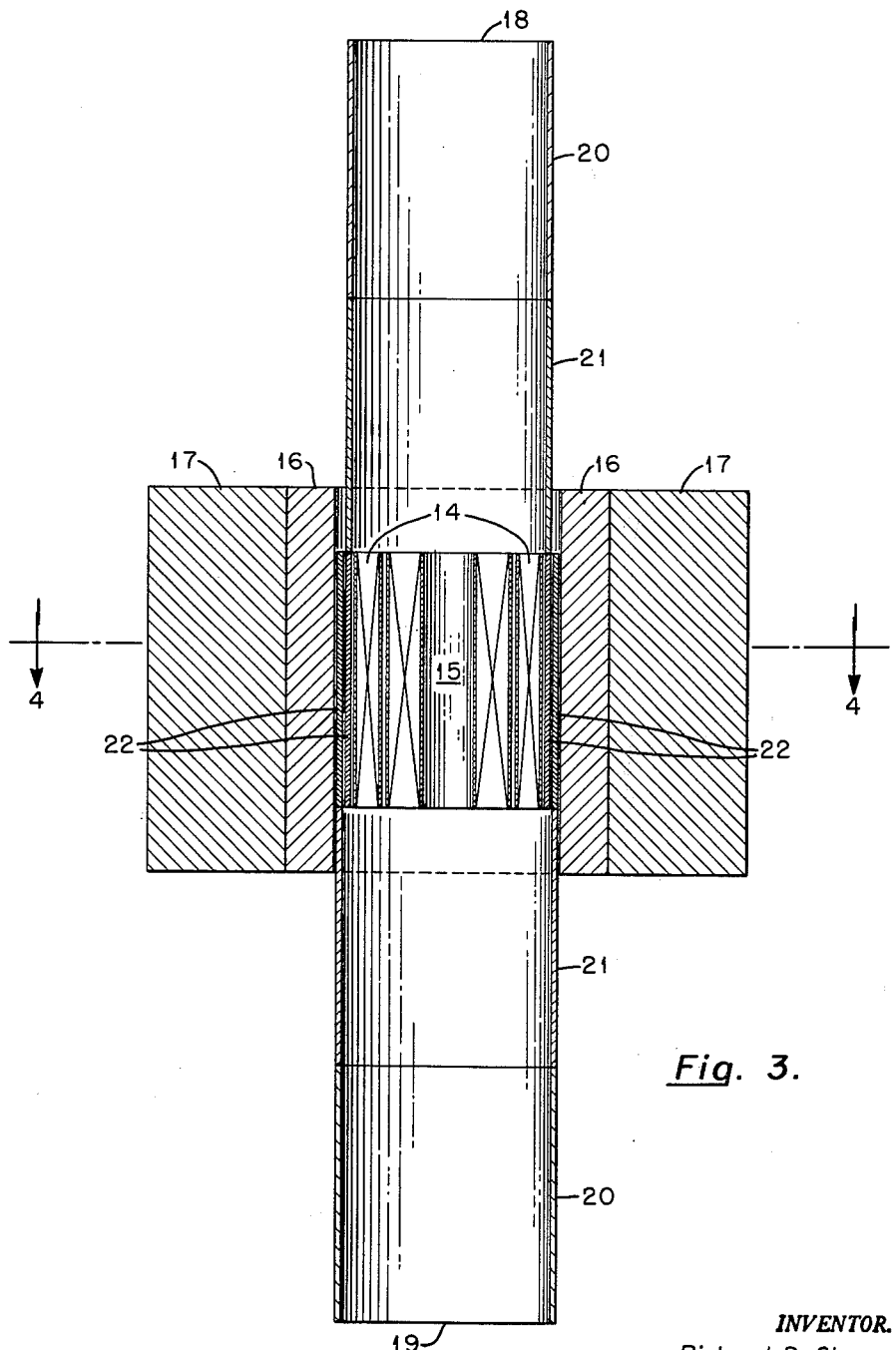
FIG. 3 is a vertical sectional view of a specific reactor embodiment utilizing the present invention.
Figure 4:
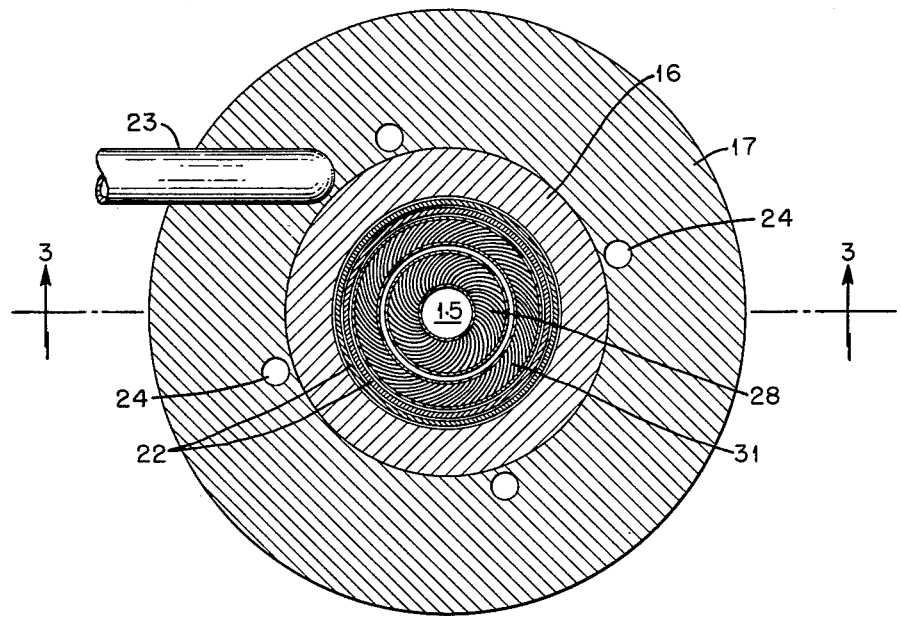
FIG. 4 is a horizontal sectional view of the reactor embodiment illustrated in FIG. 3.

To illustrate the invention in greater detail, the following detailed description of a flux trap reactor capable of achieving thermal neutron flux of above $10^{15}$ n/cm.$^2$/sec. is presented. Referring conjunctively to FIGS. 3 and 4, which are, respectively, vertical and horizontal sectional views of a reactor embodiment utilizing the present invention, an annular fuel region 14, which will be described in greater detail below, defines a central cylindrical channel 15, and is surrounded by a removable beryllium reflector 16 and a permanent beryllium reflector 17. Located between fuel region 14 and removable reflector 16 are two concentrically nested cylindrical plates 18 and 19 which independently move vertically in response to any conventional control means (not shown).

Each of the control cylinders is approximately three core lengths in height, and is fabricated in three stacked sections 20, 21, 22, each section being approximately one core length in height and differing markedly from the other two sections with respect to neutron absorption. Section 20 of each control plate is a low-cross-section segment and is fabricated from aluminum; sections 21 are formed of a medium-cross-section material, titanium; and sections 22 are fabricated from a high-cross-section material, dysprosium. The control plates are shown in FIG. 3 in their most absorptive configuration—i.e., the reactor is in its least reactive configuration. As the reactor operates and the reactivity dwindles as a result of burnup, control cylinder 18 is moved downwardly while cylinder 19 is moved simultaneously upward, thereby compensating for the loss of reactivity. This system of concentric cylindrical plates controls reactivity over a wide range, while causing a minimum perturbation in the thermal neutron flux of the reactor.

The reactor is provided with a multiplicity of beam facilities 23 and hydraulic rabbit facilities 24 for experimental use. Channel 15, which is defined by annular fuel region 14, serves as a receptacle for target materials used in the production of radioactive isotopes.

Figure 5:
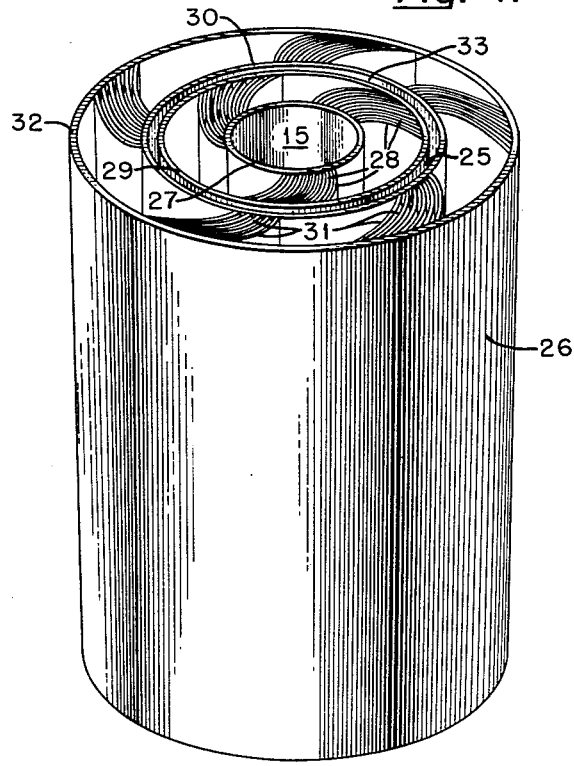
FIG. 5 is an isometric view of the core of the reactor embodiment illustrated in FIGS. 3 and 4; and, FIGS. 6 and 7 are transverse sectional views of fuel plates from the core illustrated in FIG. 5.

Turning now to FIG. 5, which is a perspective view of the fuel elements which occupy the annular fuel region 14 of FIGS. 3, and 4, inner annular element 25 is nested within outer annular element 26, the two elements thus comprising the fuel region 14 (FIGS. 3 and 4) which defines central channel 15.

Inner element 25 comprises an inner aluminum tube 27, which is provided with 171 parallel, aluminum-clad fuel plates 28, each of which radially follows the path of an involute generated from a circle having a diameter equal to the outer diameter of inner tube 25. (Only a few representative fuel plates are shown in each of the two fuel elements in FIG. 5.) At the outer periphery of inner element 25, the fuel plates are restrained in an equally spaced relationship by grooved tube 29 which is similar to inner tube 27.

In a similar manner, outer element 26 consists of an inner grooved aluminum tube 30, to which 369 aluminum-clad fuel plates 31 are attached. Fuel plates 31 radially follow the path of an involute generated from a circle having a diameter equal to the outer diameter of tube 30, and are held, at the outer periphery of the element, in parallel spaced relationship by grooved tube 32, which is similar to inner tube 30. It will be noted that the diameter of tube 30 is substantially greater than the diameter of tube 29, thus providing space 33 between the two elements.

Returning now to FIGS. 3 and 4, fuel elements 25 and 26 are schematically shown in occupation of fuel region 14 and are supported from below by any suitable supporting means (not shown). The reactive assembly illustrated in these figures is surrounded by a pressure shell (not shown), through which ordinary water is circulated to cool and partially moderate the core. Thus, water is present in the spaces between the involute shaped fuel plates of fuel elements 25 and 26, the space 33 between elements 25 and 26, and completely fills central channel 15. It can be seen that the reactor comprises an annular fueled region 14 surrounded by outer reflectors 16 and 17, and penetrated by an inner moderator "island" formed by the water which occupies channel 15. As can be seen from an examination of Table I below, the fueled region 14 of the reactor is undermoderated. The reactor, therefore, is of the "flux trap" class in which the thermal neutron flux peaks in the surrounding reflector and inner "island" and is at a minimum within the fueled region. Due to the presence of water gap 33 between elements 25 and 26, a slight peaking also occurs at that point in the fueled region. With a uniform fuel distribution, the power density distribution would peak similarly.

TABLE I

Core dimensions:
   Inner fuel annulus—
      Inner diameter (in.) -- 5.07.
      Outer diameter (in.) -- 10.52.
      Height (in.) -- 24.
   Outer fuel annulus—
      Inner diameter (in.) -- 11.36.
      Outer diameter (in.) -- 17.13.
      Height (in.) -- 24.
   Reflector—
      Inner diameter (in.) -- 18.88.
      Outer diameter (in.) -- 43.0.
      Height (in.) -- 24.
Core Materials:
   Fuel -- Enriched uranium (~90%).
   Fuel loading (kg. $U^{235}$) -- ~8.
   Coolant -- $H_2O$.
   Island moderator-reflector -- $H_2O$.
   Reflector -- Be+5% $H_2O$.
   Structural -- Al.
   Metal/water ratio -- 1.0.

Figure 6:
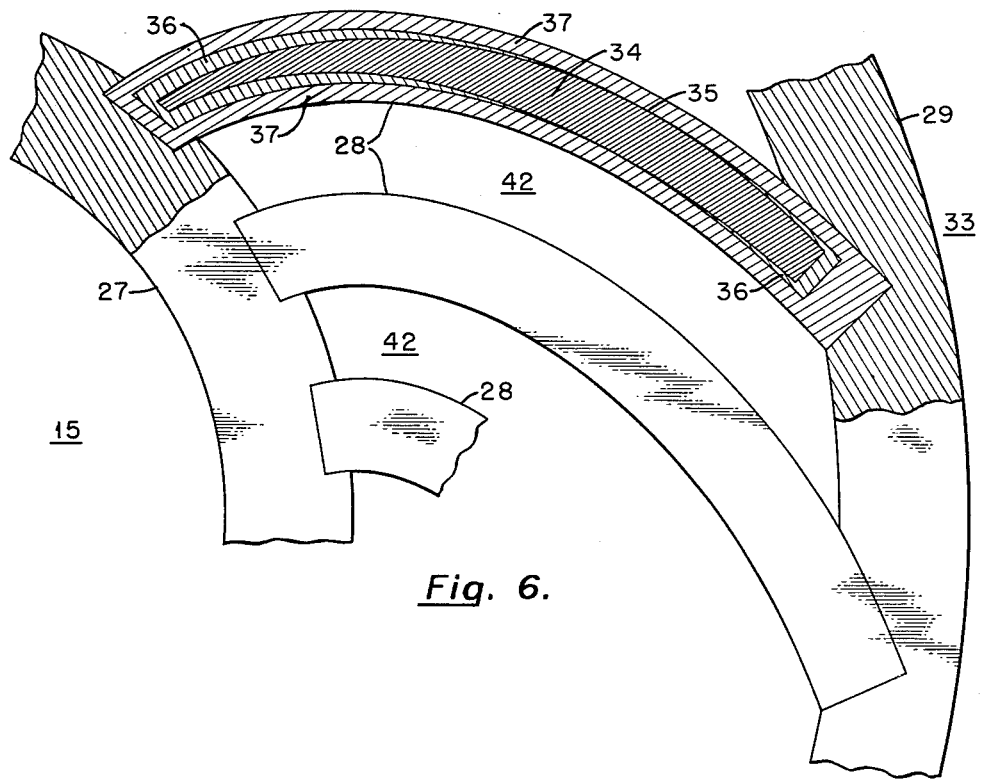

Turning now to FIG. 6, which is a transverse sectional view of one fuel plate from inner fuel element 25, primary core 34, consisting essentially of 19 weight percent uranium (enriched to approximately 90% in $U^{235}$), $9 \times 10^{19}$ atoms of natural boron/cm.$^3$, 2 weight percent silicon, the balance being aluminum, varies from a minimum thickness at the edge held by aluminum tube 27 to a maximum thickness at point 34 to a smaller thickness at the edge held by outer tube 29. Bonded to the sides of primary core 34 are two aluminum wedges 36 containing $9 \times 10^{19}$ atoms of natural boron/cm.$^3$. These two wedges comprise the secondary core and vary in thickness so that the composite core—i.e., primary core 34 plus secondary core 36—is of uniform thickness across the plate. A cladding of aluminum 37 completely surrounds and is bonded to the composite core.

Figure 7:
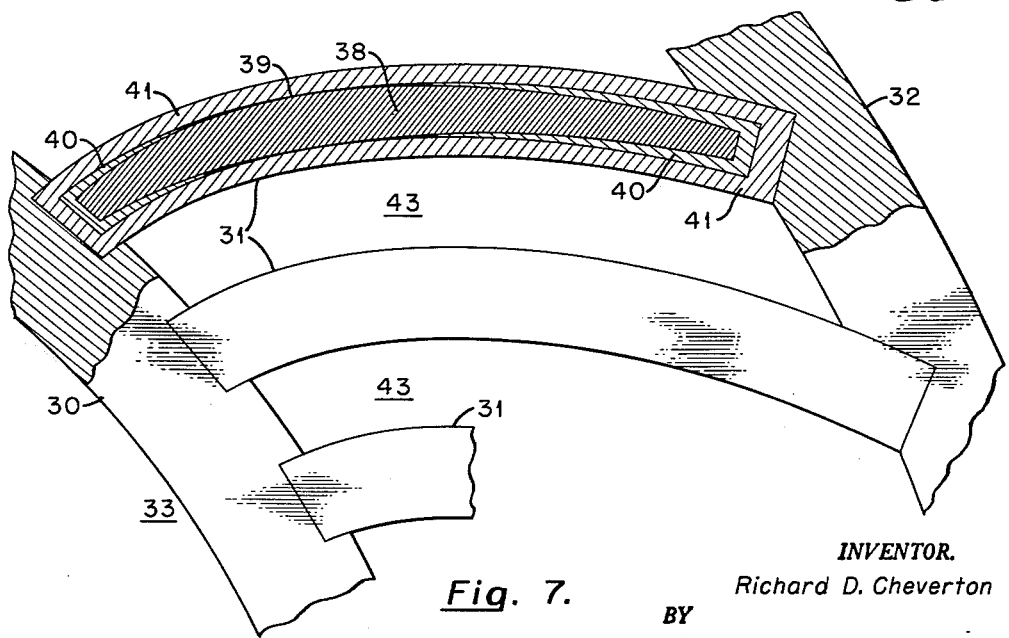

Turning now to FIG. 7, which is a similar transverse sectional view of a fuel plate from outer fuel element 26, primary core 38, consisting essentially of 27 weight percent uranium (enriched to approximately 90 percent $U^{235}$), 2 weight percent silicon, the balance being aluminum, increases in thickness from the edge held by inner tube 30 to a maximum at point 39 to a smaller thickness at the edge held by outer tube 32. Bonded to the sides of primary core 38 are two aluminum wedge-shaped inserts 40 which are in turn surrounded by aluminum cladding 41. Aluminum wedges 40 contain no boron in this plate and are present as filler pieces only.

Returning to FIG. 5, which the descriptions of FIGS. 6 and 7 in mind, it can be readily seen that the fueled core of the reactor, which consists of elements 25 and 26, possesses a fuel concentration gradient which varies in thickness from inner tube 27 to outer tube 32. The fuel and poison gradients illustrated significantly reduced the power peaking which would result if a uniform fuel distribution had been used. Table II below summarizes the over-all dimensions of the fuel plates illustrated in FIGS. 6 and 7, while Table III, which follows, gives the variation in thickness of the primary and secondary fuel cores from side to side.

TABLE II

*Over-all fuel plate dimensions*

Inner annulus:
   Number of plates -- 171
   Width of plate (along involute) (in.) -- 3.54
   Width of composite core (along involute) (in.) -- 3.13
   Length of plates (in.) -- 24
   Length of composite core (in.) -- 20
   Thickness of plates (in.) -- 0.050
   Thickness of composite core (in.) -- 0.030
   Spacing between plates (in.) -- 0.050
Outer annulus:
   Number of plates -- 369
   Width of plate (along involute) (in.) -- 3.20
   Width of composite core (along involute) (in.) -- 2.84
   Length of plates (in.) -- 24
   Length of composite core (in.) -- 20
   Thickness of plates (in.) -- 0.050
   Thickness of composite core (in.) -- 0.030
   Spacing between plates (in.) -- 0.050

TABLE III

*Primary and secondary core dimensions*

| Distance from inside edge of fuel core (inches) | Thickness (inches) | |
|---|---|---|
| | Primary Core | Secondary Core |
| Inner Annulus: | | |
| 0 (inside edge) | 0.008 | 0.022 |
| 0.2 | 0.010 | 0.020 |
| 0.4 | 0.013 | 0.017 |
| 0.6 | 0.015 | 0.015 |
| 0.8 | 0.018 | 0.012 |
| 1.0 | 0.021 | 0.009 |
| 1.2 | 0.023 | 0.007 |
| 1.4 | 0.026 | 0.004 |
| 1.6 | 0.028 | 0.002 |
| 1.8 | 0.029 | 0.001 |
| 2.0 | 0.030 | 0 |
| 2.12 | 0.030 | 0 |
| 2.20 | 0.030 | 0 |
| 2.4 | 0.030 | 0 |
| 2.6 | 0.029 | 0.001 |
| 2.8 | 0.027 | 0.003 |
| 3.0 | 0.025 | 0.005 |
| 3.130 | 0.024 | 0.006 |
| Outer Annulus: | | |
| 0 | 0.018 | 0.012 |
| 0.2 | 0.022 | 0.007 |
| 0.4 | 0.025 | 0.005 |
| 0.6 | 0.028 | 0.002 |
| 0.8 | 0.030 | 0 |
| 1.0 | 0.030 | 0 |
| 1.2 | 0.030 | 0 |
| 1.4 | 0.029 | 0.001 |
| 1.6 | 0.028 | 0.002 |
| 1.8 | 0.026 | 0.004 |
| 2.0 | 0.024 | 0.006 |
| 2.2 | 0.022 | 0.008 |
| 2.4 | 0.020 | 0.010 |
| 2.6 | 0.018 | 0.012 |
| 2.8 | 0.017 | 0.013 |
| 2.84 | 0.016 | 0.014 |

The above-described composite fuel plates may readily be fabricated by rolling techniques which are well-known in the art. The composite core, with the desired thickness variations between primary and secondary segments being present, is initially fabricated into a billet having a thickness much greater than the desired final thickness. Cladding plates, and a picture frame, which are also much thicker than finally desired, are placed around the core billet, and the resulting assembly is reduced in thickness by rolling at elevated temperatures. The thickness variations which were present in the original core billet are retained throughout the rolling process.

The fuel distribution in the reactor described above provides a core in which the radial maximum peak to average power density during a core lifetime is 1.2, whereas the same reactor with a uniform fuel distribution would have a maximum peak to average power density of 3.6.

Many deviations from and modifications of the embodiment described herein may be made within the scope of the invention. Accordingly, it is intended that the invention be limited only by the claims appended hereto.

What is claimed is:
1. In a neutronic reactor fuel element plate having a central fissionable fuel-bearing core surrounded by a protective cladding, the improvement which comprises a composite core of uniform thickness, said composite core being divided into a primary core which varies in thickness across its width, said primary core containing a fissionable fuel of uniform composition and a burnable neutron poison; and a secondary core consisting essentially of a burnable neutron poison dispersed in a carrier material covering at least one of the major surfaces of said primary core.

2. The improvement of claim 1 wherein the concentration of burnable poison, expressed in number of atoms per unit volume, is uniform throughout said composite core.

3. In a neutronic reactor fuel element plate having a central fissionable fuel-bearing core surrounded by a protective cladding, the improvement which comprises a composite core of uniform thickness said composite core being divided into a primary core which varies in thickness across its width, said primary core containing a fissionable fuel of uniform composition; and a secondary core consisting essentially of a burnable neutron poison dispersed in a carrier material covering at least one of the major surfaces of said primary core.

4. The improved fuel element of claim 3 wherein the concentration of burnable poison expressed in the number of atoms per unit volume, is uniform throughout said composite core.

5. An improved neutronic reactor fuel element plate containing a fissionable fuel and a burnable poison distributed in a concentration gradient across the width of said element, the improvement in said element being that said burnable poison is distributed in a concentration gradient which differs in magnitude and direction from the fissionable fuel concentration gradient.

6. An improved neutronic reactor fuel element plate containing a fissionable fuel and a burnable poison distributed in a concentration gradient across the width of said element, said burnable poison being distributed in a concentration gradient which differs in magnitude from the fissionable fuel concentration gradient.

7. An improved neutronic reactor fuel element plate containing a fissionable fuel and a burnable poison distributed in a concentration gradient across the width of said element, said burnable poison being distributed in a concentration gradient which differs in direction from the fissionable fuel concentration gradient.

References Cited by the Examiner
UNITED STATES PATENTS

| | | | |
|---|---|---|---|
| 2,967,812 | 1/61 | Thurber | 176—70 |
| 2,984,613 | 5/61 | Bassett | 176—68 |
| 2,998,367 | 8/61 | Untermyer | 176—56 |
| 3,049,486 | 8/62 | Currier et al. | 176—69 |
| 3,122,484 | 2/64 | Iskenderian | 176—68 |

FOREIGN PATENTS

| | | |
|---|---|---|
| 1,241,339 | 8/60 | France. |
| 1,249,178 | 11/60 | France. |

OTHER REFERENCES

GER-1301, A Design Description of the Dresden Nuclear Power Station, Nov. 26, 1956, pages 12–15.

TID–7559 (Part 1), Gatlinburg Fuel Elements Conference, August 1959, pp. 9–27, 48, 53–69 and 213–232.

CARL D. QUARFORTH, *Primary Examiner.*

OSCAR R. VERTIZ, *Examiner.*